(12) United States Patent
Chang

(10) Patent No.: US 6,837,600 B2
(45) Date of Patent: Jan. 4, 2005

(54) SELF-ADJUSTABLE AUXILIARY VEHICLE LAMP ADJUSTED WITH THE TURNING OF THE VEHICLE

(76) Inventor: Hsin Fu Chang, 235 Chung-Ho Box 8-24, Taipei (TW)

( * ) Notice: Subject to any disclaimer, the term of this patent is extended or adjusted under 35 U.S.C. 154(b) by 23 days.

(21) Appl. No.: 10/309,373

(22) Filed: Dec. 5, 2002

(65) Prior Publication Data
US 2004/0109323 A1 Jun. 10, 2004

(51) Int. Cl.$^7$ ................................................ B60Q 1/00
(52) U.S. Cl. ..................... 362/486; 362/35; 362/287; 362/418
(58) Field of Search ................................ 362/486, 528, 362/549, 35, 287, 418, 485

(56) References Cited

U.S. PATENT DOCUMENTS

| | | | | |
|---|---|---|---|---|
| 2,981,828 A | * | 4/1961 | Worden | 362/486 |
| 4,414,613 A | * | 11/1983 | Mayer | 362/549 |
| 5,673,989 A | * | 10/1997 | Gohl et al. | 362/35 |
| 5,769,526 A | * | 6/1998 | Shaffer | 362/459 |
| 5,806,956 A | * | 9/1998 | Hyun-Jo | 362/35 |
| 6,386,740 B1 | * | 5/2002 | Grissom | 362/477 |

* cited by examiner

Primary Examiner—Y. My Quach-Lee
Assistant Examiner—Peggy A. Neils

(57) ABSTRACT

An auxiliary vehicle lamp comprises an outer casing, a lower casing coupled to the outer casing and a rotary lamp. The rotary lamp further comprises: a seat portion, a rotary seat and an illuminating lamp. The seat portion has a bottom seat. The bottom seat is a cylinder with a chamfered portion. An upper side of the bottom seat is tapered and is extended with a rod portion. The rotary seat having one end which is formed with a coupling hole and is chamfered to be matched to the chamfered portion of the seat. An upper inner side of the coupling hole having a ball bearing which is exactly coupled to the rod. The rotary seat has a weight; and an upper side of the rotary seat has a lock screw for locking the illuminating lamp.

5 Claims, 10 Drawing Sheets

SELF-ADJUSTABLE AUXILIARY VEHICLE LAMP ADJUSTED WITH THE TURNING OF THE VEHICLE

FIELD OF THE INVENTION

The present invention relates to vehicle illuminating devices, and particularly to an auxiliary vehicle lamp which is self-adjustable with turning of the vehicle.

BACKGROUND OF THE INVENTION

In general, for having a better illumination, auxiliary vehicle lamps are added to a front end of a car so as to enhance the illumination effect of the car. Especially at night, the auxiliary vehicle lamps can present a preferred effect. The auxiliary vehicle lamps are fixed to the front side of the car and only illuminates a short coverage in front of the car so that the auxiliary vehicle lamps has an effect like a near light. As a result, when the car turns, the lamps emit light at the exactly front area of the car, but the drivers see the area after turning. This area is not illuminated by any lamp of the car. That is to say, current light arrangement of car can not match the requirement of the drivers as the car is turning, especially in weak light area, for example, at night.

Thereby, there is an eager demand for a novel auxiliary vehicle lamp which can radiate the area after the car turns its direction so that the drivers can drive the car safely.

SUMMARY OF THE INVENTION

Accordingly, the primary object of the present invention is to provide an auxiliary vehicle lamp comprising an outer casing having two holes at two sides thereof for being screwed by respective screws; and a lower casing coupled to the outer casing. The rotary lamp comprises a seat portion, a rotary seat and an illuminating lamp. The seat portion has a bottom seat. The bottom seat is a cylinder with a chamfered portion. An upper side of the bottom seat is tapered and is extended with a rod portion. The rotary seat having one end which is formed with a coupling hole and is chamfered to be matched to the chamfered portion of the seat. An upper inner side of the coupling hole having a ball bearing which is exactly coupled to the rod. The rotary seat has a weight; and an upper side of the rotary seat has a lock screw for locking the illuminating lamp.

The various objects and advantages of the present invention will be more readily understood from the following detailed description when read in conjunction with the appended drawing.

DETAILED DESCRIPTION OF THE PREFERRED EMBODIMENTS

Figure 1:
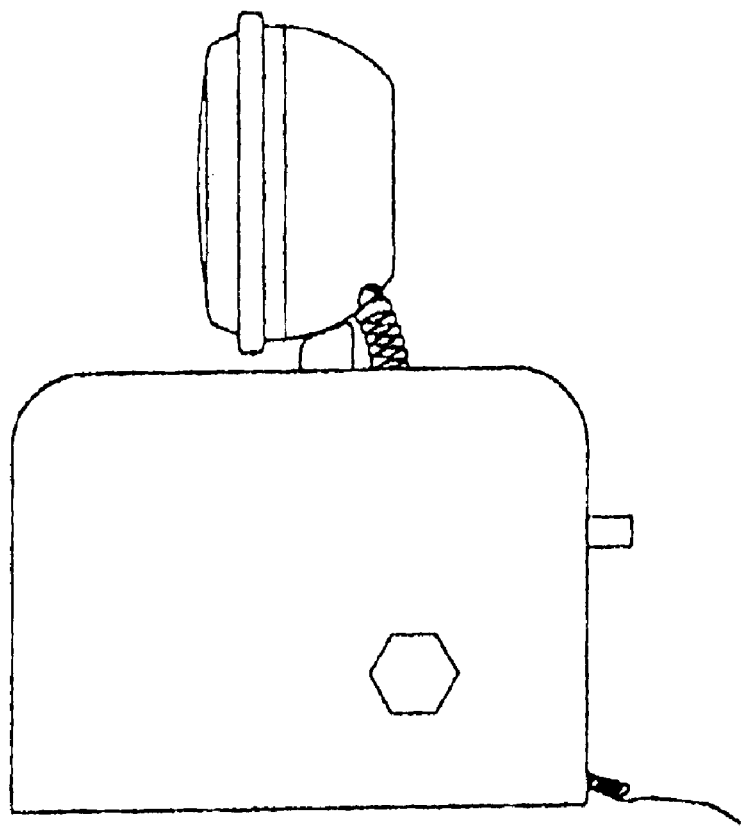
FIG. 1 shows a perspective view of the present invention.
Figure 2:
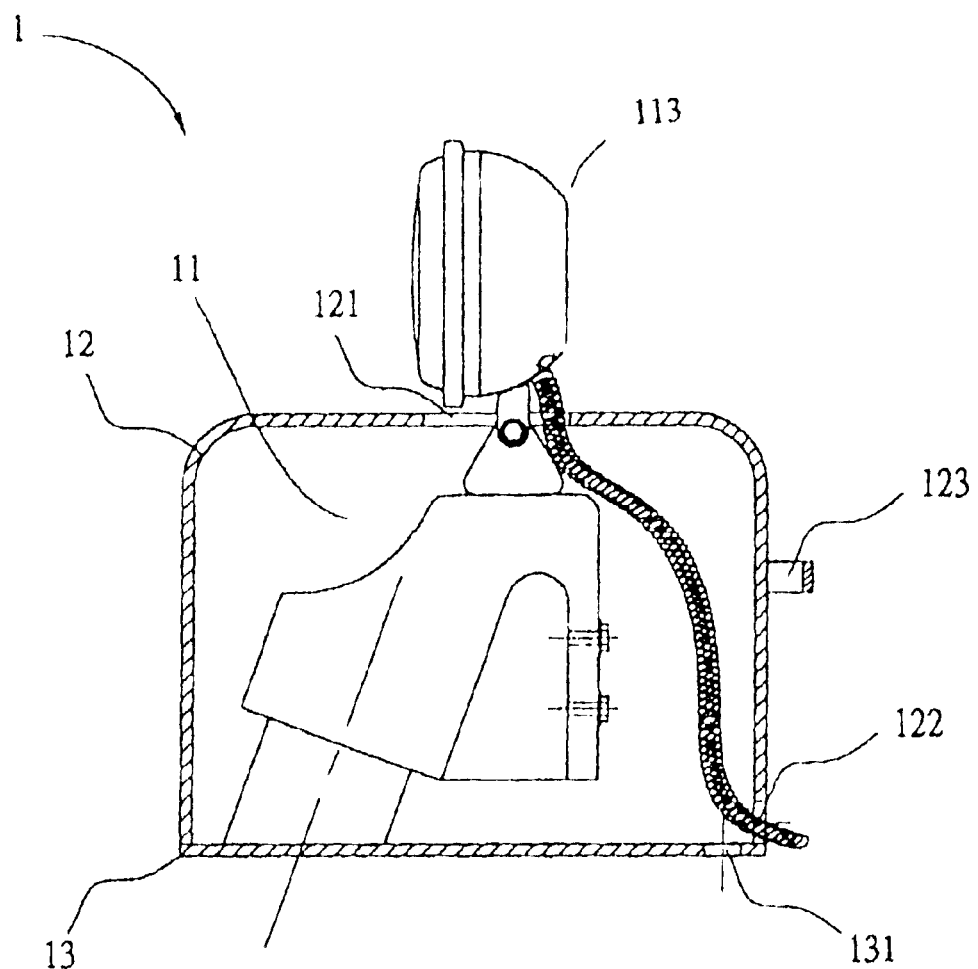
FIG. 2 is a cross sectional view showing the components of the present invention.

Referring to FIGS. 1, 2, 3, and 4, the auxiliary vehicle lamp 1 of the present invention includes a rotary lamp 11, an outer casing 12 and a lower casing 13. Referring to FIG. 2, the rotary lamp 11 is locked to the lower casing. Then the outer casing 12 covers the rotary lamp 11. The rotary lamp 11 has an illuminating lamp 113 protruded out of the outer casing 12 from a round hole 121 of the outer casing 12.

Figure 3:
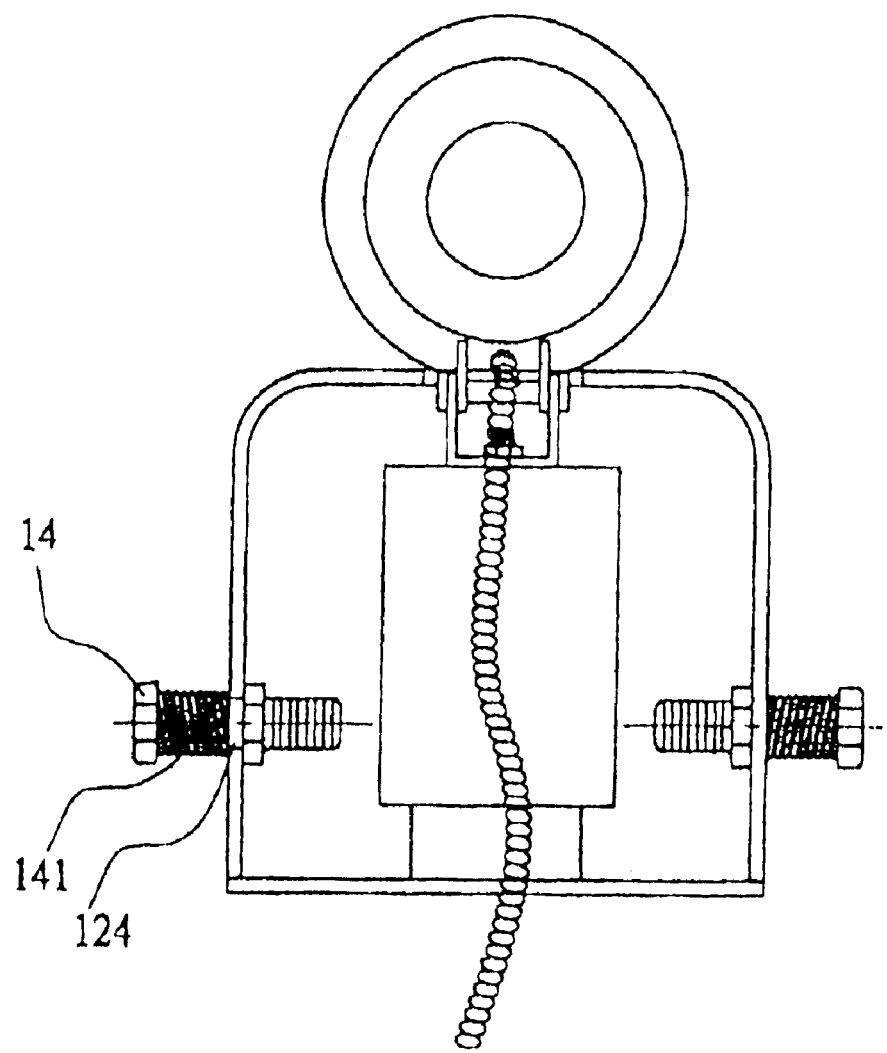
FIG. 3 is a rear cross sectional view about the components of the present invention.

A rear side of the outer casing 12 has a power wire hole 122. The power wire of the rotary lamp 11 protrudes out from this power wire hole 122 so as to be connected to a vehicle power source. A draining hole 131 is formed at a rear side of the lower casing. As shown in FIG. 3. Each of two sides of the outer casing 12 has a screw hole 124 which is engaged with a screw 14. A spring 141 is arranged around the screw 14 for tightening each screw 14. When the rotary lamp 11 swings, the swing extent is confined by the two screws 14.

Referring to FIGS. 5, 6, 7, and 8, the rotary lamp 11 is formed by a seat 111, a rotary seat 112, and the illuminating lamp 113. The bottom seat 1111 of the seat 111 is a cylinder with a chamfered portion of 20 degrees. An upper side of the bottom seat 1111 is tapered and is extended with a rod 1112. One end of the rotary seat 112 has a coupling hole 1121 and is chamfered with an angle of 20 degrees. An upper inner side of the coupling hole 1121 has a ball bearing 1122 which is exactly coupled to the rod 1112. A rear side of the rotary seat 112 has a weight 1125 which is locked by a screw screwing into the locking hole 1125. An upper side of the rotary seat 112 has a lock screw 1123 for locking the illuminating lamp 113.

Figure 9:
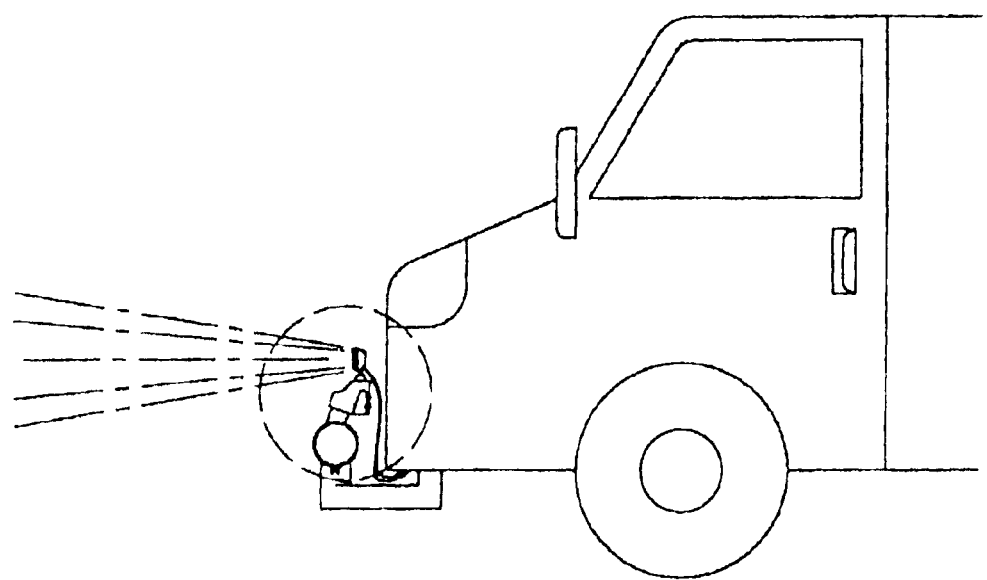
FIG. 9 is a schematic view showing one application of the present invention.
Figure 10:
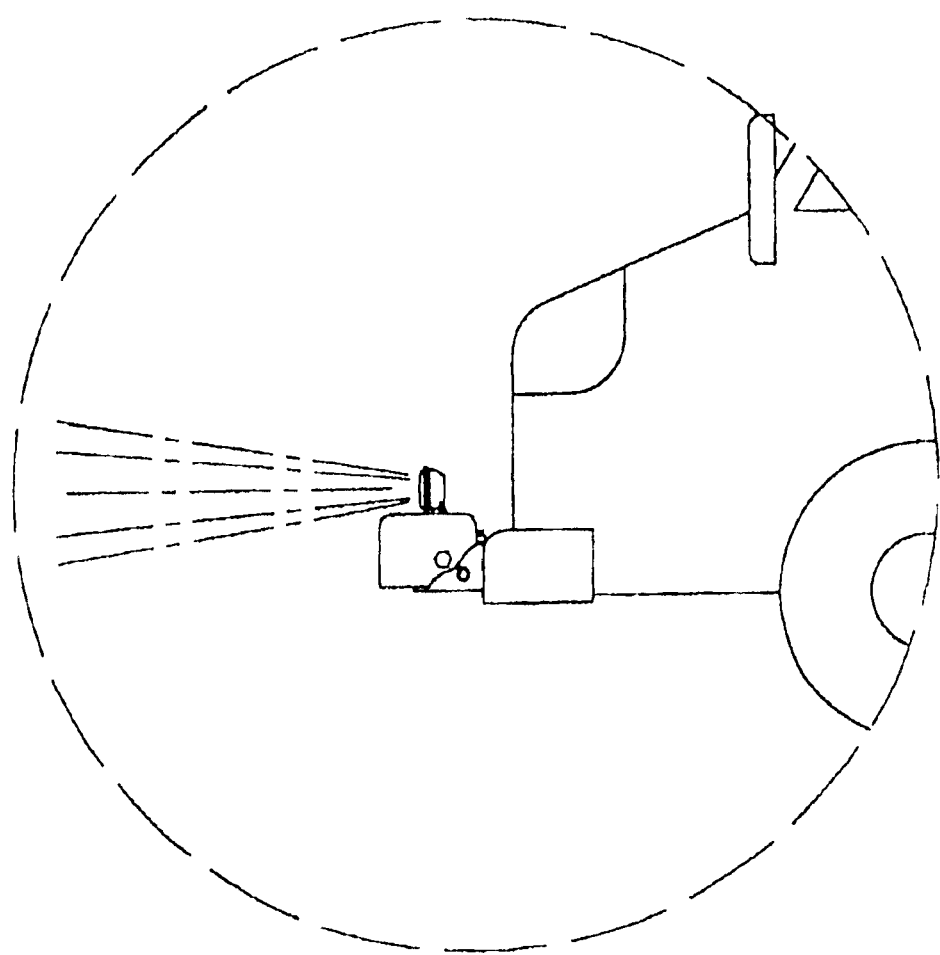
FIG. 10 is a schematic view showing another application of the present invention.

By assembling above components, an auxiliary vehicle lamp 1 of the present invention is formed. The auxiliary vehicle lamp can be installed to a car, as shown in FIGS. 9 and 10.

Due to the chamfered portions of the seat 111 and rotary seat 112, after installed, the seat 111 and rotary seat 112 inclines backwards so that the illuminating lamp 113 can be installed to the rotary seat 112 horizontally. Moreover, due to the weight 1125, if direction of the vehicle changes, by the inertia of the weight, the lamp is guided to turn along the turning direction of the vehicle so as to illuminate the traveling area.

Figure 4:
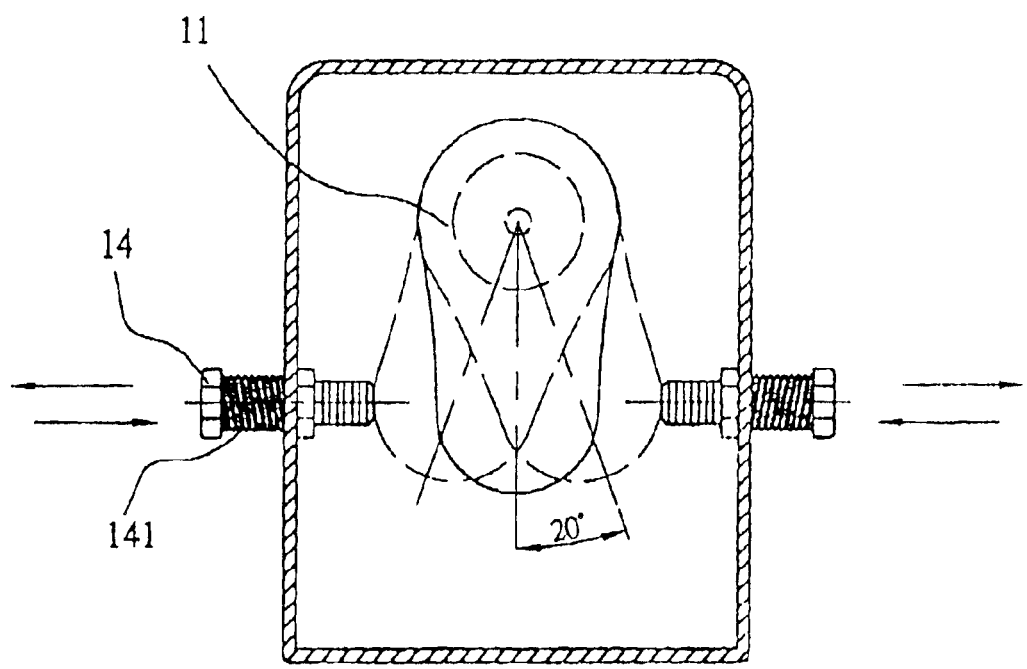
FIG. 4 is an upper cross sectional view showing the operation of the present invention.
Figure 5:
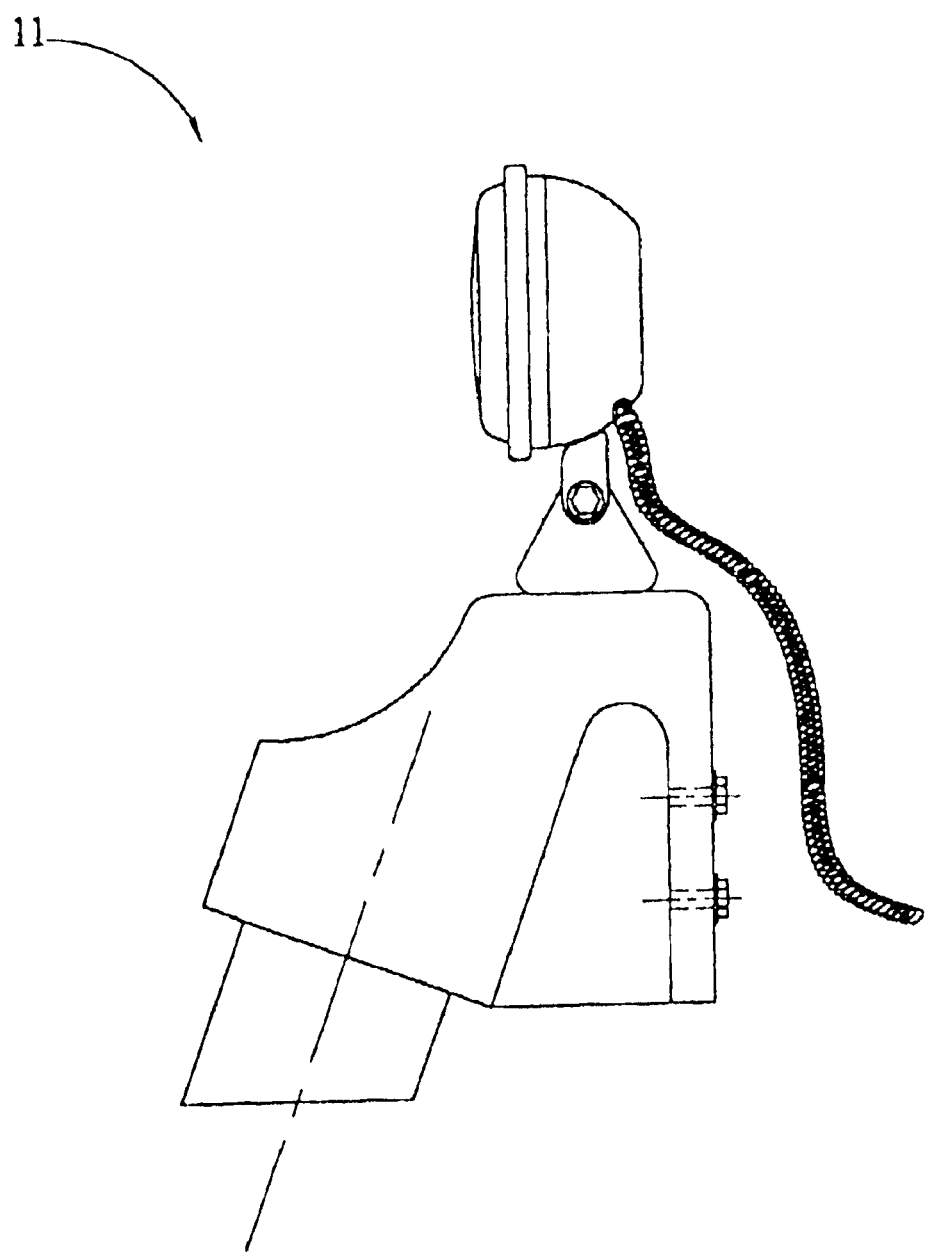
FIG. 5 is a schematic view showing the components of the present invention.
Figure 6:
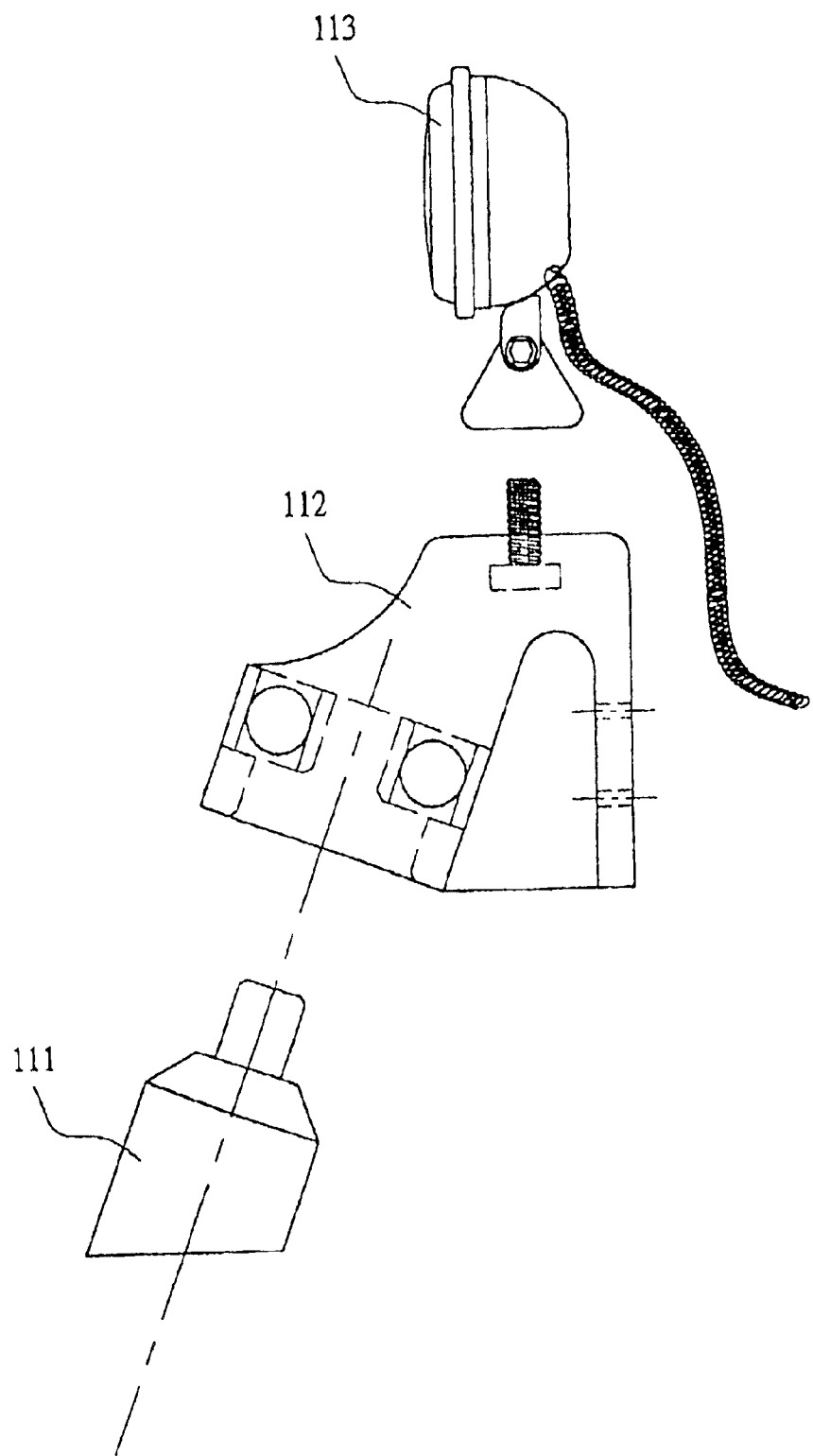
FIG. 6 is an assembly view of the present invention.
Figure 7:
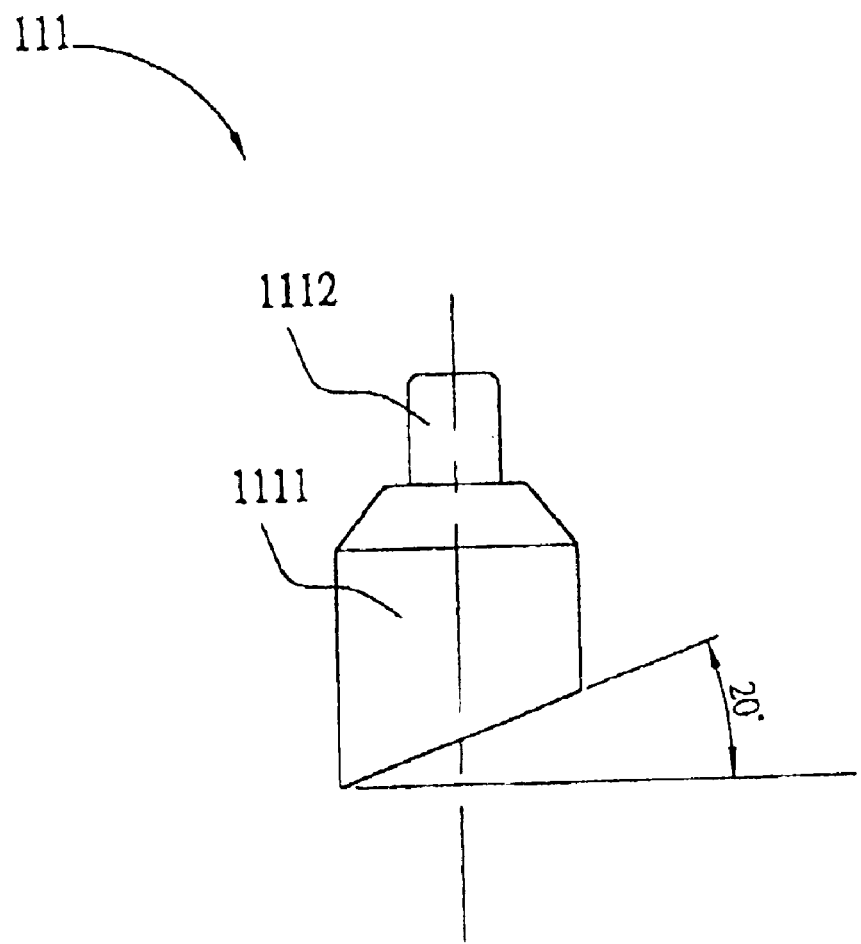
FIG. 7 is a schematic view showing the components of the present invention.
Figure 8:
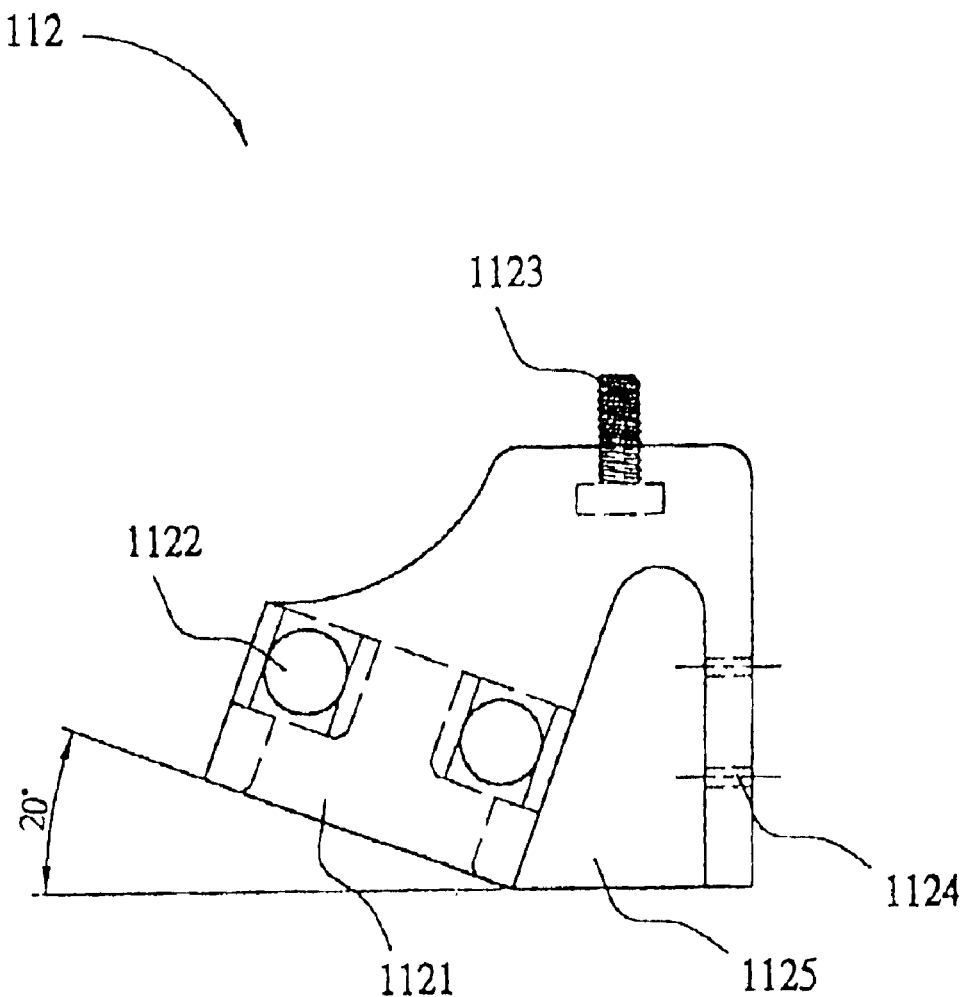
FIG. 8 is another schematic view showing the components of the present invention.

The rotary angle of the rotary seat 112 is adjustable by the inserting length of screws 14 at two sides of the outer casing 12 (referring to FIG. 4).

It should be noted that dynamic driving of the rotary lamp is powerless (for example, battery) so that the cost is low. Thereby, retainers can be attached to the outer casing 12 according to the vehicle fixing the auxiliary vehicle lamp of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An auxiliary vehicle lamp comprising:

an outer casing having two holes at two sides thereof for being screwed by respective screws;

a lower casing coupled to the outer casing;

a rotary lamp further comprising; a spat portion, a rotary seat and an illuminating lamp; the illuminating lamp protruding out of the outer casing from a round hole on the outer casing and the seat portion and rotary seat are placed within the outer casing;

the seat portion having a bottom seat; the bottom seat being a cylinder with a chamfered portion; an upper side of the bottom seat being tapered and being extended with a rod portion;

the rotary seat having one end which is formed with a coupling hole and is chamfered to be matched to the chamfered portion of the seat; an upper inner side of the coupling hole having a ball bearing which is exactly coupled to the rod; the rotary seat having a weight; and an upper side of the rotary seat having a lock screw for locking the illuminating lamp;

wherein the rotary lamp is locked to the lower casing; the outer casing covering the rotary lamp; a rear side of the outer casing having a power wire hole; the power wire of the rotary lamp protruding out from this power wire hole so as to be connected to a vehicle power source; a draining hole formed at a rear side of the lower casing; a spring arranged around the screw inserted into the screw hole for tightening the screw; by assembling the above components, an auxillary vehicle lamp is formed.

2. The auxiliary vehicle lamp as claimed in claim 1, wherein the weight is formed at a rear side of the rotary seat.

3. The auxiliary vehicle lamp as claimed in claim 1, wherein the outer casing is separable from the lower casing.

4. The auxiliary vehicle lamp as claimed in claim 1, wherein the weight is integrally formed with the rotary seat.

5. The auxiliary vehicle lamp as claimed in claim 1, wherein the lower casing and the seat portion are formed integrally.

* * * * *